(12) United States Patent
Haci et al.

(10) Patent No.: US 9,846,981 B2
(45) Date of Patent: Dec. 19, 2017

(54) ACCESS MONITORING SYSTEM FOR REMOTE LOCATIONS

(71) Applicant: WELLFENCE LLC, Houston, TX (US)

(72) Inventors: Marc Haci, Houston, TX (US); Arturo Quezada, Houston, TX (US)

(73) Assignee: WELLFENCE LLC, Houston, TX (US)

( * ) Notice: Subject to any disclaimer, the term of this patent is extended or adjusted under 35 U.S.C. 154(b) by 0 days.

(21) Appl. No.: 15/461,831

(22) Filed: Mar. 17, 2017

(65) Prior Publication Data

US 2017/0193719 A1    Jul. 6, 2017

Related U.S. Application Data

(63) Continuation-in-part of application No. 14/737,518, filed on Jun. 12, 2015.

(60) Provisional application No. 62/011,156, filed on Jun. 12, 2014.

(51) Int. Cl.
*G07C 9/00* (2006.01)
*H04N 7/18* (2006.01)
*G06Q 10/06* (2012.01)

(52) U.S. Cl.
CPC . *G07C 9/00142* (2013.01); *G06Q 10/063114* (2013.01); *G07C 9/00158* (2013.01); *H04N 7/181* (2013.01); *H04N 7/188* (2013.01)

(58) Field of Classification Search
CPC ............ G97C 9/00142; G97C 9/00158; H04N 7/181; H04N 7/188
USPC .................................. 340/5.5–5.55
See application file for complete search history.

(56) References Cited

U.S. PATENT DOCUMENTS

| | | | |
|---|---|---|---|
| 8,326,538 B2 | 12/2012 | Hobbs et al. | |
| 9,668,522 B2 * | 6/2017 | Memari | ..................... B65B 3/04 |
| 2011/0245981 A1 * | 10/2011 | Refai-Ahmed | ......... G06F 1/206 |
| | | | 700/282 |
| 2017/0034205 A1 * | 2/2017 | Canedo | ............... H04L 63/1441 |

* cited by examiner

*Primary Examiner* — Allen T Cao
(74) *Attorney, Agent, or Firm* — Halit N. Yakupoglu

(57) ABSTRACT

A system for compliance monitoring of a user of a monitored location is provided. The system includes at least one checkpoint monitor installed in the monitored location and a system server at a monitoring center being configured to be in communication with each checkpoint monitor via a network. Each checkpoint monitor includes a checkpoint server and being configured to monitor access to the monitored area. Each checkpoint monitor is configured to perform an authentication process to authenticate both an assignment status and an activity status of a user and transmit the resulting data to the system server.

34 Claims, 10 Drawing Sheets

ACCESS MONITORING SYSTEM FOR REMOTE LOCATIONS

RELATED APPLICATIONS

This application is a Continuation-in-Part of U.S. patent application Ser. No. 14/737,518, entitled "System For Remotely Monitoring Well Sites" filed on Jun. 12, 2015, which claims priority from U.S. Provisional Patent Application Ser. No. 62/011,156 entitled "System For Remotely Monitoring A Well Site" filed on Jun. 12, 2014, both of which are expressly incorporated by reference herein in their entirety.

BACKGROUND

Field of the Invention

The present invention relates generally to electronic access systems and, more particularly, to methods and systems for monitoring access to fenced or unfenced remote locations, fields or outdoor sites such as, without limitation, hydrocarbon recovery locations, well sites or any land or offshore based hydrocarbon recovery facilities Description of the Related Art Industrial companies can have remote production facilities in remote environments. Such remote facilities can use manufacturing equipment, machines and systems to perform various operational stages of a planned work including building, preparation, production or maintenance. Depending on the work, the work schedules in such remote facilities can be continuous, a year around fashion, or seasonal, which are followed by operators or work crews assigned to the remote facility.

For example, hydrocarbon recovery or production fields, such as for oil or natural gas production, are often located in remote locations and include equipment such as drilling rigs, pumps and other related equipment and machinery. The equipment in such remote fields is most often attended by on-site machine operators or crews whom actually operate or maintain the equipment, although the company owning the facility is located in a city often hundreds of miles away.

During an active operation cycle, the operators generally can operate the equipment such as the drilling equipment. However, if the operation is not a day-to-day activity, for example, a post drilling work activity involving hydrocarbon recovery using pumps and storage tanks, a maintenance operator or a maintenance crew can visit the facility periodically to observe the operation in the facility.

In either case, in the instances, for example, where the facility experiences a problem, the operator must then solve the problem or alert the company for help. The problem can be related to the machinery malfunction, vandalism or natural catastrophe related given the remote nature of the facility.

In today's economy, the lost productivity and opportunity due to unwanted down time generated by such problems can be extremely costly if a service crew or engineer is not dispatched on time to the remote site of the facility by the company.

Therefore, it is important for the company monitor the activity of the operators on the remote site to reduce the amount of facility down time to a minimum while increasing reliance by getting instantly updated about problems, changes or modifications in the facility.

Thus, from the foregoing, there is an unaddressed need exists for a novel system and method in the industry to address the aforementioned deficiencies quickly and efficiently.

SUMMARY

An aspect of the present invention includes a system for compliance monitoring of a user of a monitored location in a hydrocarbon wellsite including a system server in a monitoring center, the system server including a processor and a system data storage including an assignment data table for the monitored location and a system program that when executed causes the processor to operate the system, wherein the assignment data table includes user assignment status data and user activity status data; and at least one checkpoint monitor in the monitored location, each checkpoint monitor including a controller and a local data storage including the assignment data table received from the system server and a control program that when executed causes the controller to operate the checkpoint monitor, wherein each checkpoint monitor is configured to authenticate both a user assignment status and a user activity status by analyzing an access code that is transmitted to the checkpoint monitor from a user access code device, wherein the authentication of the user assignment status identifies the user by authenticating a user identifier included in the access code against user assignment status data included on the assignment data table stored in the local data storage, wherein the authentication of the user activity status updates the user activity status data on the assignment data table by utilizing an activity status identifier added to the access code by the user to provide that the user is either in a check in activity to enter the monitored location or in a check out activity to exit the monitored location, and wherein the system server is configured to form an updated assignment data table by receiving at least one of an updated user activity status data from at least one of the checkpoint monitors and an updated user assignment status data related to the monitored location from a client organization interface.

Another aspect of the present invention includes a method for compliance monitoring of a user of a monitored location in a hydrocarbon wellsite including providing a system server in a monitoring center, the system server including a processor and a system data storage including an assignment data table for the monitored location and a system program that when executed causes the processor to operate the system, wherein the assignment data table includes user assignment status data and user activity status data; installing at least one checkpoint monitor in a checkpoint zone located on a perimeter of the monitored location, each checkpoint monitor including a controller and local data storage including the assignment data table received from the system server and a control program that when executed causes the controller to operate the checkpoint monitor; establishing a communication link between each checkpoint monitor and the system server; transmitting an access code to one of the check point monitors from a user access code device operated by the user; determining a user assignment status by authenticating a user identifier included in the access code against the user assignment status data on the assignment data table stored in the local data storage; determining a user activity status by updating the user activity status data on the assignment data table by utilizing an activity status identifier added to the access code by the user to provide that the user is either in a check in activity to enter the monitored location or in a check out activity to exit the monitored location; forming an updated assignment data table in the system server by receiving at least one of updated user activity status data from at least one checkpoint monitor and updated user assignment status data related to the monitored location from a client organization interface.

Another aspect of the present invention includes a checkpoint monitor device of a monitoring system for compliance monitoring of users of a monitored location in a hydrocarbon wellsite, the checkpoint monitor device including a controller and a data storage storing a control program that when executed causes the controller to operate the checkpoint monitor; an assignment data table received from the monitoring system and stored in the data storage, the assignment data table having user assignment status data and user activity status data, wherein the user assignment status data includes at least an identifier of a wireless access code device assigned to a user having authorization to access the monitored location; wherein the controller operable to analyze an access code received from the wireless access code device and authenticate both a user assignment status and a user activity status; wherein the authentication of the user assignment status identifies the user by authenticating the identifier of the wireless access code device included in the access code against the assignment status data on the assignment data table, and wherein the authentication of the user activity status updates user activity status data on the assignment data table by utilizing an activity status identifier added to the access code by the user to provide that the user is either in a check in activity to enter the monitored location or in a check out activity to exit the monitored location; and a communication module configured to transmit updated user activity status data to a system server of the monitoring system to form an updated assignment data table.

BRIEF DESCRIPTION OF THE DRAWINGS

These and other aspects and features of the present invention will become apparent to those of ordinary skill in the art upon review of the following description of specific embodiments of the invention in conjunction with the accompanying figures, wherein.

DETAILED DESCRIPTION OF THE EMBODIMENTS

Figure 1:
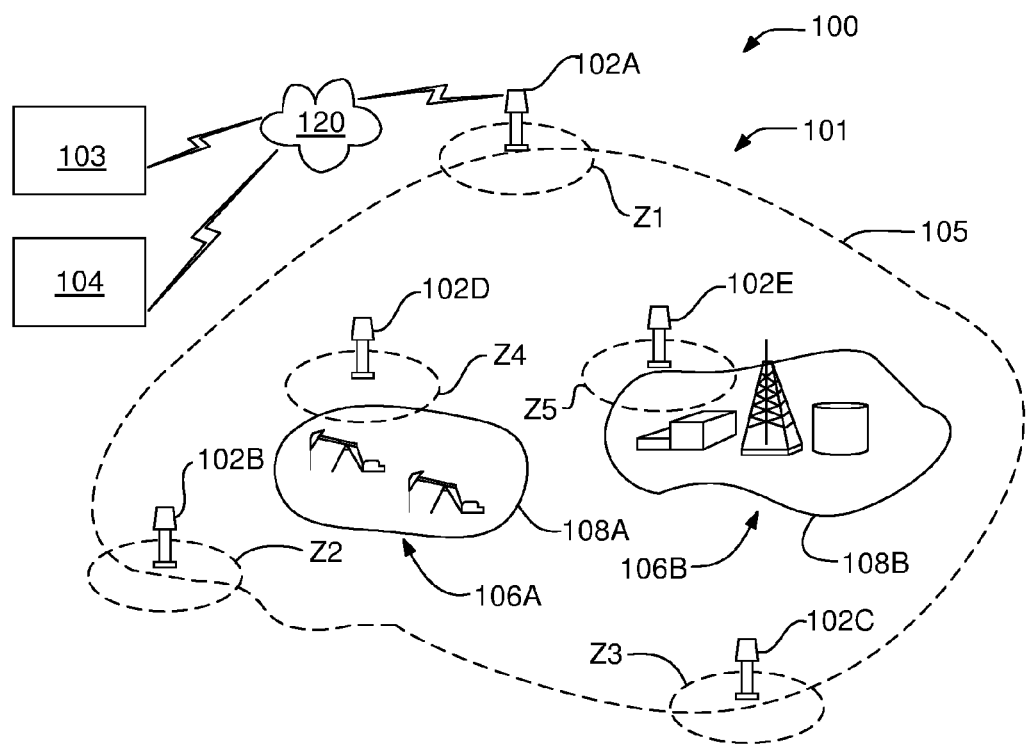
FIG. 1 is a schematic view of an embodiment of an exemplary implementation of a monitoring system of the present invention.

Unlike office buildings or large plants in urban areas with walls, fences and gates, remote oilfield worksites or work locations have porous and loosely defined perimeters. It is often a challenge for the oil companies to ensure safety and security of the personnel working in such remote worksites in oilfields. Personnel may enter and leave such worksites without being accounted for. In one embodiment, the present invention may solve this problem by introducing voluntary checkpoints, monitoring and identifying noncompliant entries and exits; then, resolving such noncompliant events to obtain an accurate headcount of the personnel on such remote worksites in oilfields, thereby increasing safety and security of the personnel in such locations. Embodiments of the present invention may provide systems that enforce time and attendance compliance by way of monitoring the activity of authorized employees or users of a remote location. By tracking employee compliance with scheduled work assignments, for example, in remote hydrocarbon fields, such as oilfields, employer organizations may achieve high employee time and attendance compliance levels in such environments, which may reduce maintenance and production cost while increasing productivity. Embodiments of the present invention provide systems that may enforce time and attendance compliance by way of monitoring the activity of authorized employees or users of remote locations.

In one embodiment, the present invention provides a system and a method that address the monitoring of employee compliance at remote work sites such as hydrocarbon recovery or production fields for oil or natural gas production or recovery by collecting employee access activity data from small footprint, rapid deployable electronic checkpoint monitor devices placed around the monitored locations and their sublocations creating a virtual or electronic fence for each location. Such collected data from all the checkpoint monitors is then transmitted to a central monitoring server or system server where the collected data is integrated, analyzed and presented to the location administrators with activity reports and visual confirmation of every event, and the like. The system and method of the invention may track employee activities and allow for remote visual monitoring of the remote work sites for client organizations. The monitoring system may further utilize a wide area network, including routers, servers and software to provide real-time compliance monitoring of employees and other personnel of the remote worksites, along with visual monitoring of the remote work site.

By ensuring compliance with assignment schedules, some of the additional benefits of the system of the present invention may be as follows: (1) minimizing or preventing equipment breakdowns and the resulting downtime; (2) ensuring equipment reliability; (3) ensuring timely repairs to equipment; (4) ensuring application of organization policy and procedures in remote work environments; (5) improving employee safety in such fields; (6) aligning payroll costs with the hours actually worked; (7) reducing administrative time in managing such remote fields; (8) reducing time spent on the administrative audits related to employee time and attendance for compliance; (9) providing asset protection and theft prevention benefits by deterring unauthorized entries, thereby reducing theft and potential safety issues; (10) providing verifiable data for the third party invoice approvals by providing access to past check-in and check-out data to verify the accuracy of the invoicing; (11) providing crew management benefits by providing instant visibility to the crew locations and observing their activities when onsite supervision is not readily available; (12) providing safety benefits by observing safety violations of unsupervised crews and promoting compliance; and (13) providing cost benefits by potentially reducing insurance premiums.

FIG. 1 shows an exemplary monitoring system 100 of the present invention related to an exemplary map view of a location 101, or a field, such as a hydrocarbon field for oil or natural gas production or recovery. Terms "location" or "field" may refer to remote location, remote field, remote site, site, area, work location, work field, worksite, work area, oilfield, oilsite, wellsite and the like. The monitoring system 100 comprises one or more checkpoint monitors (CM) 102 that are in communication with a system server 103 which may be, in turn, in communication with a client interface 104. The system server 103 may be located in a monitoring center of a monitoring company and may be configured to communicate with the checkpoint monitors in the monitored field and with the client organizations via client interfaces 104 over one or more communication networks 120, such as one or more wide area networks 120, i.e., computer networks, the Internet, telephone networks, and the like. Using the checkpoint monitors 102, the system 100 may provide real time compliance monitoring of the users or employees at the monitored location 101 and report the collected data to the client organizations via the monitoring center server 103.

In one embodiment, an exemplary compliance monitoring using the checkpoint monitors 102 of the system 100 may be performed to obtain user related information such as at least one of the user assignment status and the user activity status of the user associated with the location 101. The location 101 may be defined by a geographical perimeter 105 which may be fenceless or fenced. In this application, a fenceless location may define a location with highly porous borders, which may not have a visible and/or physically protruding fence structure surrounding at least a portion of the monitored location, and which may not have any invisible and/or non-protruding structure surrounding at least a portion of the monitored location, such as a buried sensor line or a system providing an invisible detection network around or over the monitored location. There may also be one or more work locations or worksites within the location 101, such as a first work location 106A, or a first location, including for example oil pumps, and a second work location 106B, or a second location, including for example a drilling rig and related equipment and storage facilities. The first and second work locations 106A and 106B may have geographical perimeters 108A and 108B respectively, which may be fenceless or fenced. One or more checkpoint monitors 102, such as 102A, 102B, 102C, 102D and 102E may be installed along the perimeter 105 of the location 101 and, optionally, along the perimeters 108A and 108B of the first and second work locations 106A and 106B respectively. The checkpoint monitors 102 may be in communication with the system server 103 in a remote managing facility. As will be described more fully below, each checkpoint monitor 102 in the location 101 may be surrounded by a checkpoint zone Z. Checkpoint zones Z, such as Z1, Z2, Z3, Z4 and Z5 may be defined as circular areas or cylindrical space around each checkpoint monitors 102.

The geographical perimeters 108A and 108B of the first and second work locations 106A and 106B may be nested in the geographical perimeter 105 of the location 101. Thus, the first and second locations 106A and 106B may be defined as sublocations of the location 101 which may be defined as a higher status location, or higher location, with respect to the nested smaller sublocations. When there is at least one sublocation nested in one or more higher locations as exemplified in FIG. 1, a user status information may be synchronized by obtaining and comparing the user status information from the sublocations and the user status information from the higher location in order to determine the user's status in such nested location. For example, when a user checks out of a sublocation, it still remains in checked in status on the associated higher location. If the user is in checked in status on a sublocation and then checks out of a high location, the user will be assumed as checked out on all sublocations nested by the higher location automatically. Furthermore, when a location includes multiple checkpoint monitors, the user status information may be synchronized automatically as soon as the status is updated in one of the checkpoint monitors.

Figures 2A, 2B:
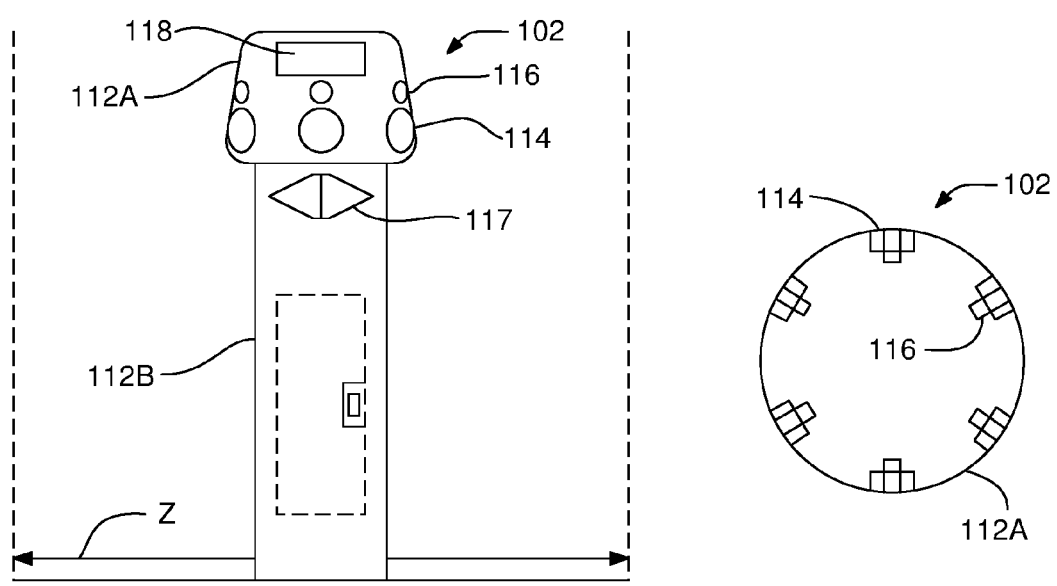
FIG. 2A-2B are schematic side and top views of an embodiment of a checkpoint monitor device of the monitoring system of the present invention.

FIG. 2A shows the checkpoint monitor 102 including a head section 112A and a body section 112B in its installed state in a monitored location. FIG. 2B shows, in top view, the head section 112A may be cylindrical and may comprise a plurality of cameras 114 and a plurality of presence sensors 116 for having 360 degrees image capture and sensing capability. The presence sensors 116 may sense any intrusion, presence or entry, such as an entry of an object, person or both, into the checkpoint zone Z. The presence sensors 116 and the cameras 114 may be integrated to work in a synchronized manner to sense and image 360 degrees. The presence sensors 116 and the cameras 114 may also operate individually to determine a user's direction of access, i.e., entry and exit direction, in the checkpoint zone Z, i.e., to determine user's direction of entry into and exit out of a checkpoint zone. In this respect, the checkpoint zones Z may be defined by the range of the presence sensor 116 around the checkpoint monitors 102. An exemplary checkpoint zone Z may be in the range of 1-100 meters, preferably 2-10 meters in diameter. A display 118 on the head section 112A may display various status related information in use. Warning and guide lights 117 may give users visual warnings for valid and invalid operations using different color light, such as red for invalid operations and green for valid operations. The warning and guide lights may also be configured as arrows to point at in and out directions of the monitored location to guide users. The body section 112B may contain critical inner components of the checkpoint monitors 102, such as a server having a processor, a data storage and a control software with various modules, power connections and/or power supply, various communication, data capture and detection hardware and the like devices.

Figure 3:
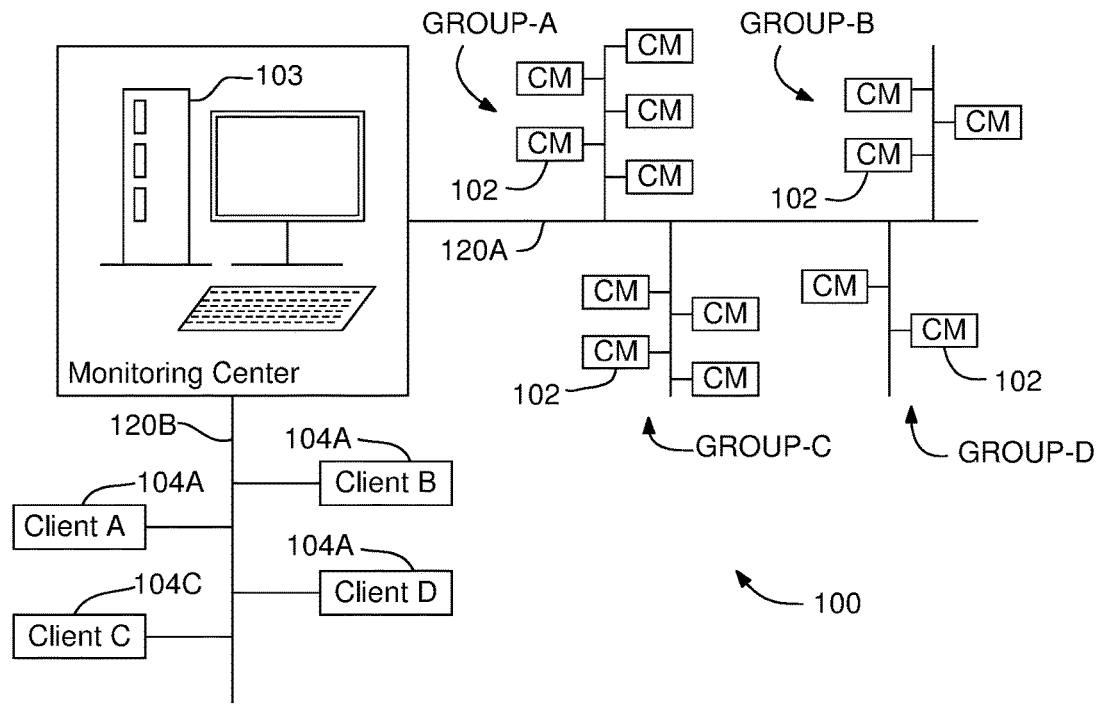
FIG. 3 is a schematic diagram illustrating an exemplary embodiment of the monitoring system.

FIG. 3 shows an exemplary embodiment of the monitoring system 100 integrating the system server 103 with a plurality of checkpoint monitors (CM) 102 installed in each monitored location and client interfaces 104 of each client organization associated with the monitored locations. In this embodiment, an independent monitoring organization may own the system server 103 and the checkpoint monitors 102, and operate the compliance monitoring process for the client organizations in the client organizations' locations. Alternatively, the system 100 including the system server 103 and the checkpoint monitors 102 may be owned by an organization having locations to be compliance monitored.

The checkpoint monitors 102 may be in communication with the system server 103 via a first communication network 120A or a first network, which may be a wireless or wired communication channel, or both. The client interfaces 104 may be in communication with the system server 103 via a second communication network 120B or second network, which may also be a wireless or wired communication channel, or both. Accordingly, the monitoring system 100 may manage a multiplicity of locations having at least one checkpoint monitor 102 and for a multiplicity of organizations related to such locations. For example, a first group (Group-A) of checkpoint monitors 102 may be installed in a first location to compliance monitor for a first client 104A; a second group (Group-B) of checkpoint monitors 102 may be installed in a second location to compliance monitor for a second client 104B; a third group (Group-C) of checkpoint monitors 102 may be installed in a third location to compliance monitor for a third client 104C; and a fourth group (Group-D) of checkpoint monitors 102 may be installed in a fourth location to compliance monitor for a fourth client 104D, and so on.

Figure 4:
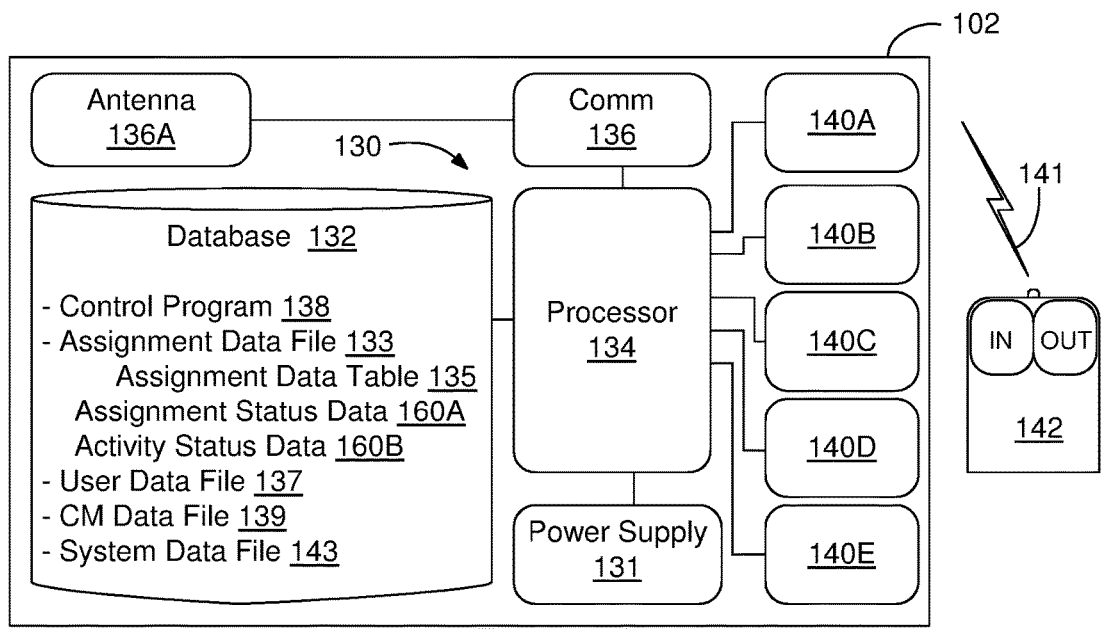
FIG. 4 is a schematic block diagram illustrating an embodiment of a checkpoint monitor device with a checkpoint server, a data storage and exemplary modules employed during compliance monitoring of users.

FIG. 4 is a block diagram illustrating components of checkpoint monitor 102 including a checkpoint server 130, or a local server, with a data storage 132, or database storing a control program 138 or software, a processor 134, and a communication module 136. The checkpoint monitor may also include a plurality of modules 140 that may be connected to the processor 134 while their corresponding software modules may be stored in the checkpoint server 130. An access module 140A, or a receiver/decoder module, receives an access code signal 141, including an access code, from an access code device 142 operated by a user accessing the checkpoint zone Z of the checkpoint monitor 102. The checkpoint monitor 102 may be powered by a power supply unit 131 which may be connected to a solar panel or power network to receive power.

The access code device 142 may be a wireless device or wired device that is part of the checkpoint monitor 102, and may be designed as a mobile device operable by the user. The access code in the access code signal 141 may comprise a user identification (ID) code component and a user activity code component. The user ID code may be a unique number or barcode associated with the user and may be used to identify both the access code device 142 and the user who is authorized to carry and operate it. The user activity code may identify an activity status of the user, and which may be real time selected by the user when the access code device 142 is operated within or adjacent the checkpoint zone Z.

There may be a plurality of user activity codes which may be used to define various user activities to track the user compliance while attending the scheduled assignments in the location 101 (FIG. 1). In one embodiment, the user may select the activity code by operating activity buttons of the access code device 142 by pressing on them. Operating activity buttons of the access code device 142 may also transmit the access code signal 141 including both the user identification code and the selected user activity code. Each activity button on the access code device 142 may have assigned activity indicators. In this embodiment, for example, selecting the button with "in" indicator may add "check in" activity code to the access code signal indicating that the user is entering the monitored location; and selecting the button with "out" indicator may add "check out" activity code to the access code signal indicating that the user is exiting the monitored location. Although in this example the access code device 142 includes two activity buttons, it may have multiple buttons, each assigned to one or more user activity codes. Further, the buttons used in this embodiment may be replaced with any pressure or touch activated surfaces, zones or devices such as keys, keypads, touchpads or touchscreens. As will be more fully described below, the user ID code and the user activity code may be used to determine user's assignment status and activity status by the checkpoint monitors 102 in the monitored location.

In alternative embodiments, the access code device 142 may have more activity buttons or zones with assigned activity indicators. Exemplary additional activities may be related to the reporting progress on a pre-assigned specific task in the monitored location by utilizing activity buttons indicating activities, such as "complete", "canceled", or "continue", etc. Other exemplary activity buttons or zones may be for reporting damage in the equipment, security or safety related aspects, and the like. In another embodiment, a mobile phone may be used as an access device using a suitable mobile phone application allowing an access code signal to be sent to the checkpoint monitor via the mobile phone network. A keypad or touchscreen of the mobile phone may be used to select a wide variety of activity indicators utilizing either pre-assigned keys or by simply typing in to add activity codes to the access code signal which also carries user ID or the user ID code. As described above, each activity code may indicate a unique user activity status. The access code signal 141 may be received and decoded by the access module 140A, and the decoded user ID code and activity code may be stored in the data storage 132 and also shown on the display 118 on the checkpoint monitor 102.

A sensor module 140B may be used for peripheral presence detection using for example infrared radiation, sonar, laser or audio detection sources. The sensor module 140B may be integrated to and operate the sensors 116 (FIGS. 2A-2B). An image module 140C may be used for peripheral imaging, activity tracking and recognition purposes, and may use video, still imaging (photos) and infrared imaging. The image module 140C may be integrated to and operate the cameras 114 (FIGS. 2A-2B). The image module 140C may be configured to take one or more pictures, including a user picture, once an intrusion into the checkpoint zone Z is sensed by sensor module 140B. A user access and routing module 140D may be used for automated access and routing to, for example, control automated gates if there is any. An integration module 140E may provide data integration between the modules 140A-140D and their corresponding hardware and other required networking. The communication module 136 may be a transceiver module to establish wireless communication between the checkpoint monitors 102 and the system server 103 via the communication network 120A.

An exemplary access module 140A for user identification may include one or a combination of the following technologies: generic 300 to 900 MHz transmitters and receivers, RFID technology (e.g., HID tags and badge readers), biometric reading devices, proprietary software authentication via proximity user cell phone connectivity using Bluetooth or WiFi at checkpoint, face recognition software, license plate detection software (e.g., locally installed software or Google cloud vision API, IBM Watson visual recognition, Open ALPR Cloud API, IBM i2 iBase Plate Analysis, etc, or T2 systems ANPR). An exemplary sensor module 140B for presence detection may include one or a combination of the following technologies: motion detectors with single or combined technologies, for example, passive infrared sensors (e.g., Panasonic AMN), passive infrared array sensors (e.g., Panasonic Grid Eye), software analytics for motion detection on camera images (standard visible light/IR cameras and thermal imaging cameras e.g. FLIR Lepton), light Detection and Ranging Sensors a.k.a. LiDAR which is a Laser based technology (e.g., Leddar IS16, Quanergy M8 or S3), ultrasonic motion detectors, and microwave motion detectors, and the like. An exemplary image module 140C for visual identification or imaging may include one or a combination of the following technologies: visible light and infrared combination cameras (e.g. ELP 720P, FLIR PE133E) and thermal Imaging Cameras (e.g., FLIR TCX). For communications between the checkpoint monitors 102 and the system server 103, an internet based network may be used and to access the internet on remote locations either a cellular modem (e.g., Multitech MTR-LAT1) or a satellite modem (e.g., Newtec MDM2200 IP Satellite Modem) may be used.

The data storage 132 stores various files including data that supports many functions of the checkpoint monitors 102. The data storage 132 may store data files including, but not limited to, an assignment data file 133 including a data related to user assignment status information and various predetermined user status information, a user data file 137 including user pictures and assigned ID codes; checkpoint monitor (CM) data file 139 including data related to the checkpoint monitor's assigned ID and GPS coordinates, location map; a system data file 143 including data related to the configuration of the checkpoint monitor, activity logs, system logs, activity media recordings (pictures, videos etc.). As also exemplified in FIGS. 6-7B, the assignment data file 133 stored in the data storage 132 may comprise at least one assignment data table 135 including assignment status data 160A and activity status data 160B of a plurality of authorized users assigned for work in that particular location where the checkpoint monitors storing the assignment file are located. The assignment status data 160A may be a list indicating each user's assignment status with user's identification, such as user name; company name; location identification, and the specific date and time that indicate each user is scheduled for work. For example, A. Smith; Alpha, Inc.; Houston Tex., USA, Field-A1 Jan. 9, 2017; 08:00 AM-10:00 AM. As described above, in one embodiment, the user's identification may be associated with the access code device and the user ID code transmitted from the access code device assigned to the user, which is received by the checkpoint monitor and, after decoded, compared against the users on the assignment data table 135 stored in the data storage 132. In this example, this company authorized employee is expected to be checked in this particular location at 08:00 AM and checked out at 10 AM.

Activity status data 160B of the users may also be kept on the assignment data table 135 and next to the assignment status data 160A. In this configuration, the assignment data table includes each user's current activity and assignment status. As described above, the user activity code indicating the user activity status may be transmitted within the access code signal 141 along with the user ID code. However, differing from the user ID code which may also be the identification of the access code device of the user, the user activity code may be selected and transmitted by the user on the location using the readily available selectable functions of the access code device 142 (FIG. 4). In the above example, when the user selects "in" option as he is entering the monitored location, his activity status on the assignment data table 135 is updated as "in" with check in timestamp. Similarly, when the user selects "out" option as he is leaving the monitored location, his activity status on the assignment data table is updated as "out" with check out time stamp. The assignment data table 135 may also include IDs of all the checkpoint monitors, such as a unique number assigned to them, in the monitored location. The assignment data table 135 contains the most recent activity status update conducted by a user at any checkpoint monitor 102 at the monitored location or an activity status update enforced by the system server 103. This most current activity status may be referred to as static status or the current status. The system data storage 132 may be in the form of non-transitory computer readable medium configured to store files, programs, tables and executable computer instructions. A computer program product stored on a non-transitory computer readable medium may include instructions executable by the processor or controller of the server to operate the checkpoint monitor 102.

Figure 5:
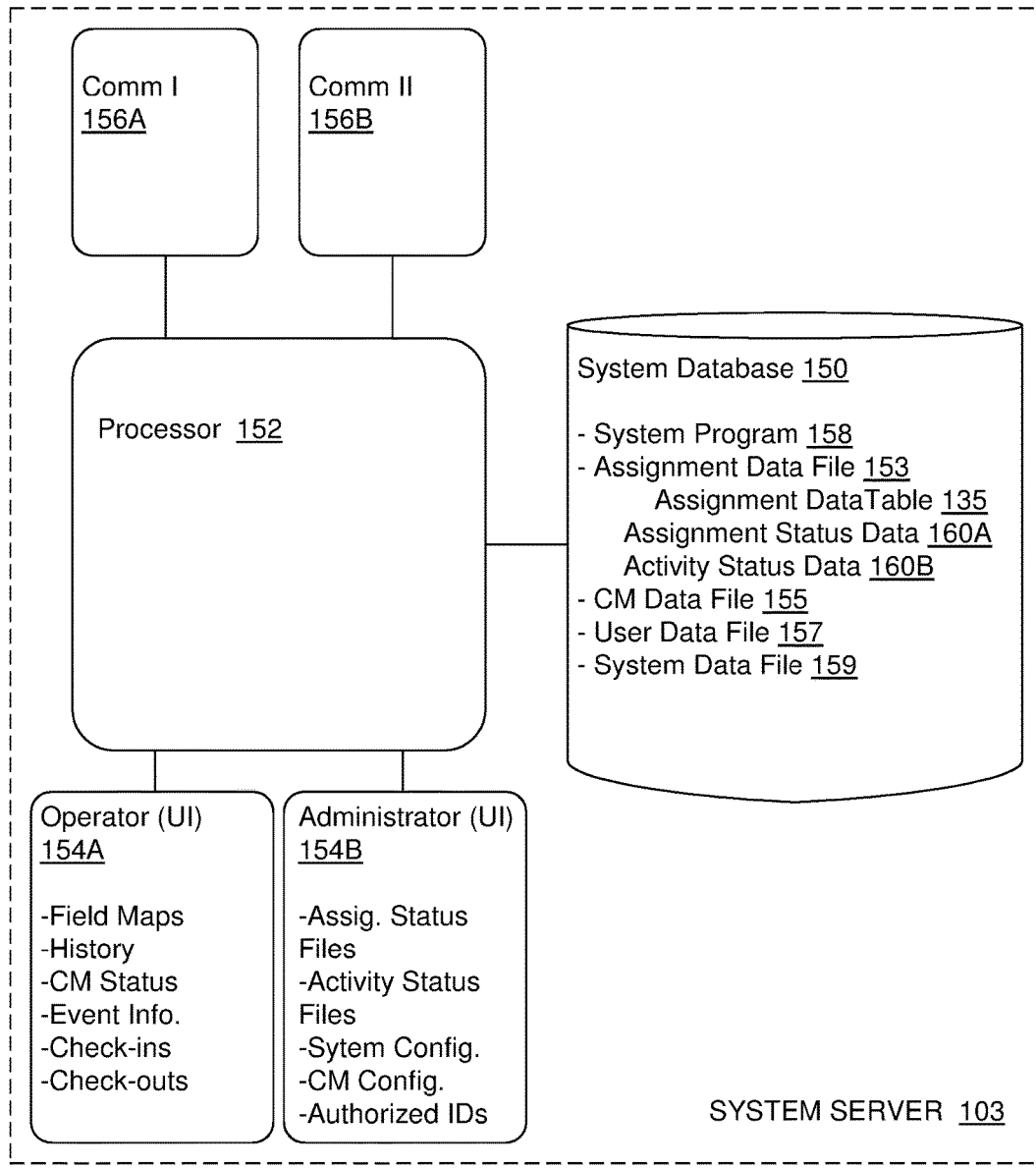
FIG. 5 is a schematic block diagram illustrating an embodiment of a system server operating the monitoring system of the present invention.

FIG. 5 is a block diagram illustrating the monitoring center server 103, or the system server, with a data storage 150 or system database, a processor 152, an operational interface 154A, an administrative interface 154B, a first communication module 156A and a second communication module 156B, a system control program 158 or software and various program modules stored in the data storage 150. The system may also have multiple levels of access with different features available on each level. Within the context of this invention, users in different professional classes may belong to an internal group or external group. An internal group may comprise technical administrators, operations management, and technicians. External groups may comprise client administrators, and operators or employers (referred to as "users" in this application). Depending on the group and level, different filters may be applied to the data presented. For instance, an external group user may not be able to see engineering or technical details on the data presented to them as it would be to a user in an internal group. An external operator should be able to see the data pertaining only to his activity, not the engineering data. An external client administrator may see the activity pertaining to his/her locations and users, but not the others or the engineering data. An internal operations manager may see locations and user activity for all the existing and past clients, and so on.

The monitoring system 100 may be managed by the system server 103 using the programs and data stored in the data storage 150. The data storage 150 stores various program files including data that support many operations of the monitoring system 100.

The first communication module 156A may communicate with checkpoint monitors 102 in the monitored location. The first communication module 156A may apply network data encryption and decryption to the data sent and/or received from the checkpoint monitors 102. The first communication module 156A may transport data securely and reliably related to the transactions between the control program 158 of system server 103 and the control software 138 of the checkpoint monitors 102. The second communication module 156B may communicate with the client organizations via client interfaces 104. The second communication module 156B may apply network data encryption and decryption to the data sent and/or received from the checkpoint monitors 102. The second communication module 156B may register time of various data received from the client interfaces 104 and processes commands and responses to and from the client interfaces 104.

The control program 158 of the system server 103 may include many utility program modules for implementing various features used in the system 100. Exemplary utility program modules may be as follows: a checkpoint monitor set up and test program module for introducing checkpoint monitors to the system 100 by adding, detecting and testing checkpoint monitors 102 as well as assigning locations and IDs for them; a data control program module to retrieve and store data in the data storage 150; and an interface program module to provide and control the communication interfaces. The operational interface 154A allows monitoring center staff to track the real time operation of the monitoring system 100 and assist the operation by providing commands and needed information based on the observations. The administration interface 154B may handle administrative aspects of the monitoring system 100, such as, but not limited to, system configurations, management schedules, client related operations, user activity status information and the configuration of monitoring checkpoints. Optionally, there may be an automatic pre verification and validation operation in place before handling such administrative aspects.

The data storage 150 may store data files used in the operation of the compliance monitoring process using the data received from the checkpoint monitors; data files received from and sent to the client organizations; and data files used in operating the monitoring system. The data files stored in the data storage 150 may include, but not limited to, assignment data files 153 including assignment data related to user assignment status information and various predetermined user status information of each client organization; checkpoint monitor data file including each checkpoint monitors assigned ID and GPS coordinates, location identifiers and location maps; a user data file including user pictures, assigned ID codes and their organizations; a client data file including services requested by each client organization and related information; a system data file including data related to the configuration of the system server 103. The system data storage 150 may be in the form of non-transitory computer readable medium configured to store files, programs, tables and executable computer instructions. A computer program product stored on a non-transitory computer readable medium may include instructions executable by the processor or controller of the server to operate the system 100.

Figures 6, 7A, 7B:
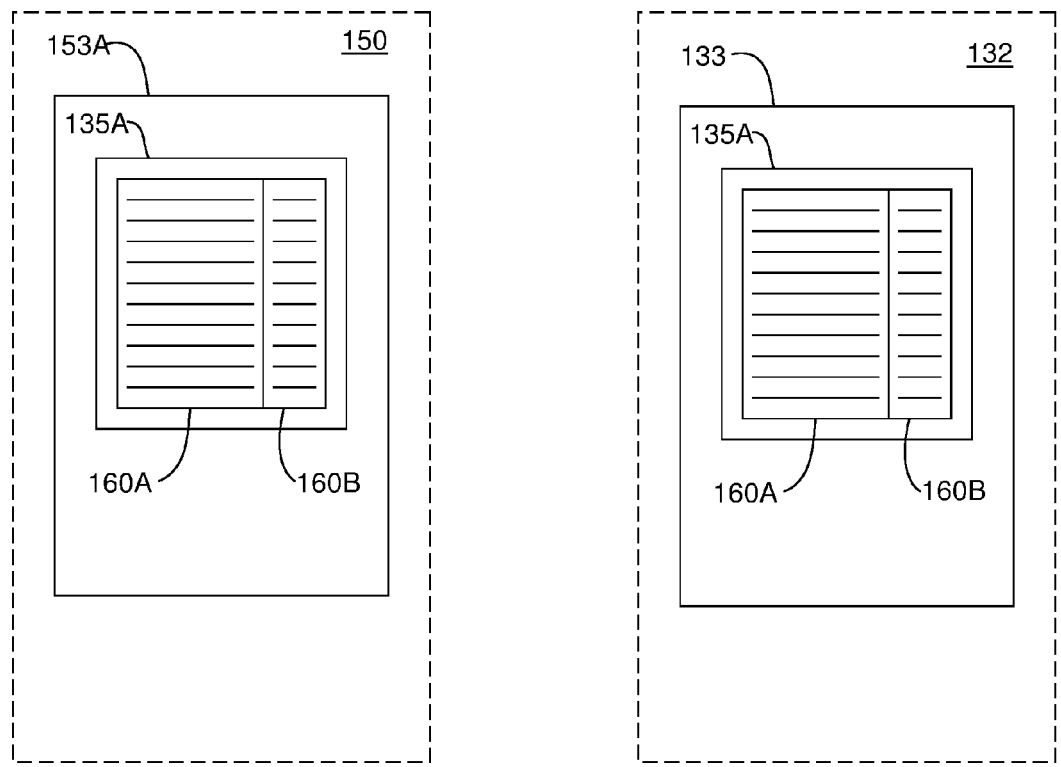
FIG. 6 is a schematic view of an assignment data table for a monitored location, the assignment data table including assignment status data and activity status data.
FIG. 7A-7B are schematic views of the assignment data table stored in the system server's database and the checkpoint monitors' data bases respectively.

As also shown in FIGS. 6-7B, the assignment data files 153 stored in the data storage 150 may comprise the assignment data tables 135 including assignment status data 160A of a plurality of authorized users assigned for work in a particular location of each organization acquiring compliance monitoring. As will be described more fully below, the assignment data tables 135 in the data storage 150 may be updated with the activity status data 160B received from at least one of the checkpoint monitors 102 in the monitored location and the updated assignment data table 135 in the data storage 150 replace the assignment data tables in the data storages 132 of all the check point monitors 102 installed in the monitored location. In this respect, the data storage 150 may have a plurality of assignment data files 153, such as 153A, 153B, 153C, 153D and so on, each belonging to a client organization acquiring compliance monitoring services from the monitoring organization (See FIG. 3). Each client organization may, in turn, have a plurality of assignment data tables 135, such as 135A, 135B, 135C, 135D and so on, each related to a corresponding monitored location. It is understood that, depending on the task in the monitored location, there may be more than one assignment data table may be used so that different task performed in for example sublocations shown in FIG. 1 may be monitored by the client organizations.

The monitoring center infrastructure may be hosted on a monitoring company managed location. Server computing hardware may be a single or a multitude of tower or rack servers (e.g., Dell PowerEdge Servers). Such servers may be provided with a multitude of communication networks configured with a combination of networking routers (e.g., Cisco 4351 ISR) and or switches (e.g., Cisco Catalyst 3650 Series) protected by security devices (e.g., Cisco ASA 5500-X Series Next-Generation Firewall). A cloud based infrastructure may be for example the Amazon Web Services or Microsoft Cloud where the system may be hosted on their physical systems with greater flexibility for implementation and growth. Custom software developed on many alternative environments may be installed on any of the systems mentioned above. Database implementations like SQL server or Oracle may be utilized as well.

FIG. 6 illustrates an exemplary assignment data table 135A including assignment status data 160A and activity status data 160B for the users authorized to work in the same monitored location. As also described above, the assignment status data 160A may include identifications of the users, their company, the region where the monitored location is located, location identification, dates and specific hours that they have scheduled work assignments, identification of the checkpoint monitors located in the location, for example, checkpoint monitors (CM) with numbers 1, 2, 3, 4 and 5. The assignment status data may also include user driver license information and/or an image copy of the driver license. The activity status data 160B may include the last updated activity status of the users of the location. Accordingly, in FIG. 6, the activity status data 160B shows that the two of the users completed their tasks in the location earlier in the week and they are "out", and the last user is still in the location and "in" at according to the latest update. However, as mentioned above, the activity status data may include other activity or operational updates informing or reporting other operational activities from the monitored location via the user accessing the location.

FIGS. 7A and 7B illustrate both the data storage 150 of the system server 103 and the data storage 132 of the checkpoint monitors 102 storing the same assignment data table 135A of the client organization. If any of the users' activity status in the monitored location is updated by one of the 5 checkpoint monitors 102, the assignment data table 135A at the system server 103 is updated and the updated assignment data table version instantly replaces the old versions in all checkpoint monitors in the monitored location. Furthermore, when new assignment data tables are received through the client interface of the system 100, the assignments tables in all the checkpoint monitors 102 in the monitored location are replaced with the new assignment data tables.

In the data storage 150, the assignment data table 135A may be kept in the assignment data file 153A of the client organization, which may hold many assignment data tables 135 for the same organization and for the monitored location as well as a multiplicity of other similarly monitored locations. The data storage 150 may hold a plurality of assignment data files 153 for a plurality of client organizations, wherein each assignment data file may hold a plurality of assignment data tables 135. Alternatively, the data storage 150 may store a single data table or data file including all the assignment status data and activity status data for all the client organizations as well as all the other data used to operate the monitoring system 100 for monitoring the locations of the client organizations. The system program 158 is configured to manage such single data table including all the data or data distributed into a plurality of data files or data tables, and these aspects are within the context of this invention.

Figure 8:
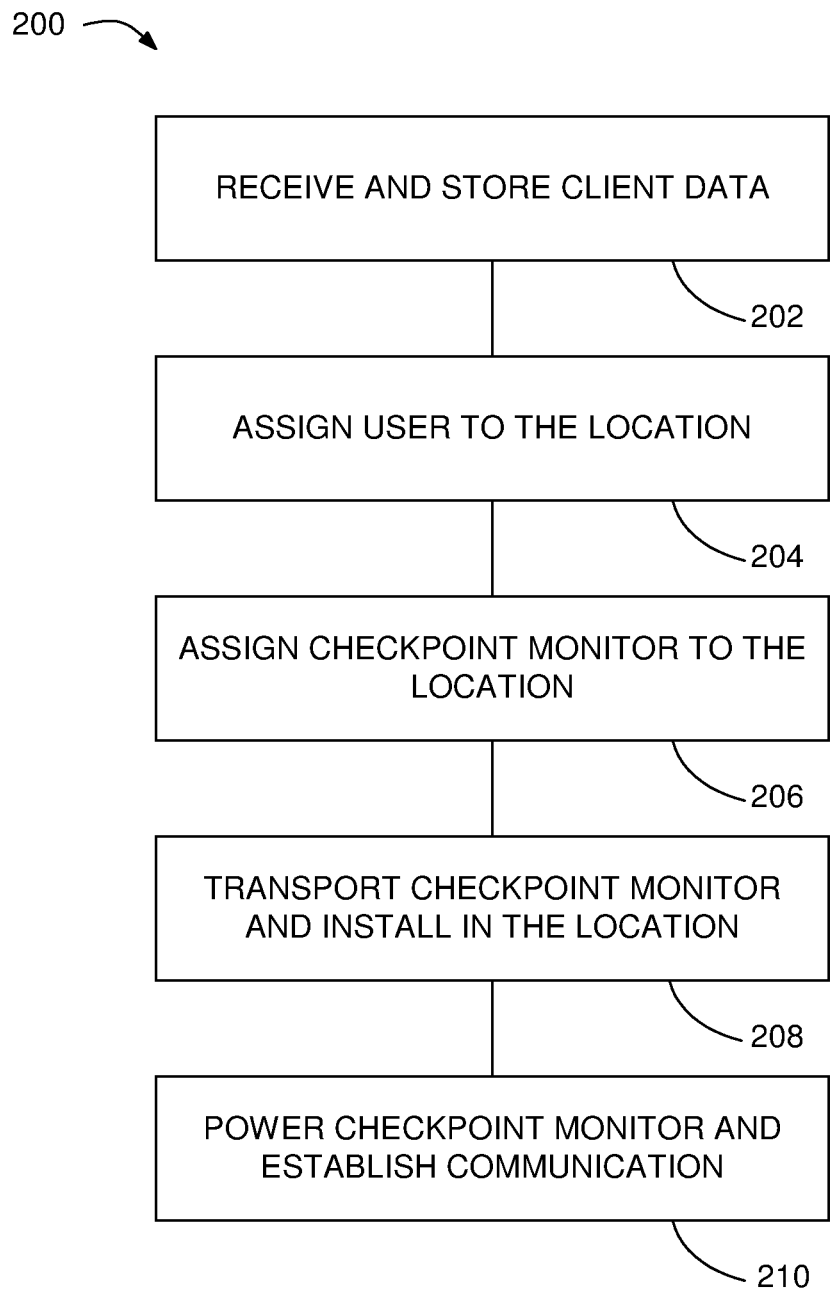
FIG. 8 is a schematic flow chart illustrating an embodiment of an exemplary operation sequence implemented in the monitoring system of the present invention.

FIG. 8 is a flowchart 200 illustrating an exemplary operation sequence in the system 100 of the present invention. Referring to FIGS. 8 and 1-7B, accordingly, in step 202, client data may be received from the client organization via the client interface 104 and stored in the data storage 150 of the system server 103. The client data file may include a digital map of the field, a user assignment file including user IDs and pictures as well as an assignment schedules. An assignment data table 135 including users' assignment status data and their activity status data may be created in the system server 103 and stored in the data storage 150.

In step 204, each user may be assigned to an access code device 142 with an access code identifying the user. The user's assigned access code may be linked to the user ID in the assignment data table 135. This operation links the user and the access code device to the assignment location identified on the assignment data table.

In step 206, each checkpoint monitor 102 may be assigned an ID and associated with the monitored location by either linking the assigned checkpoint monitor IDs to the location identified in the assignment data table 135 or directly linking them to the location at the system server 103. Similar to the user assignment to the field, the checkpoint monitor's setup process may be based on linking the checkpoint monitors 102 to the location of use. Resources that may be added or removed from the selected location may be users and checkpoint monitors. A checkpoint monitor may be deployed and added to a particular location stored on the system server 103.

Although it is part of the initial setup, the checkpoint monitors receives periodic updates of the assignment data table 135 that includes the approved users established on the location and the latest activity status based on the latest synchronization for that location/sublocation. Once the users and the checkpoint monitors 102 are linked the monitored location, the assignment data table 135 may be downloaded from the data storage 150 of the system server 103 to the data storage 132 of the checkpoint monitors 102. Alternatively, as mentioned above, the data storage 150 may store a single data table or data file including all the assignment status data and activity status data for all the client organizations. In this case of having the single data table, desired data is downloaded to the checkpoint monitor. Next, the user activity status may be updated to its initial setting as checked out to make the checkpoint monitors ready for monitoring in the location. This step completes the in-office set up process of the checkpoint monitors. In step 208, the checkpoint monitors 102 may be placed into their shipping containers, transported to the location and installed therein. In step 210, once installed in the field, the checkpoint monitors 102 are powered and wirelessly connected to the system server 103.

Figure 9:
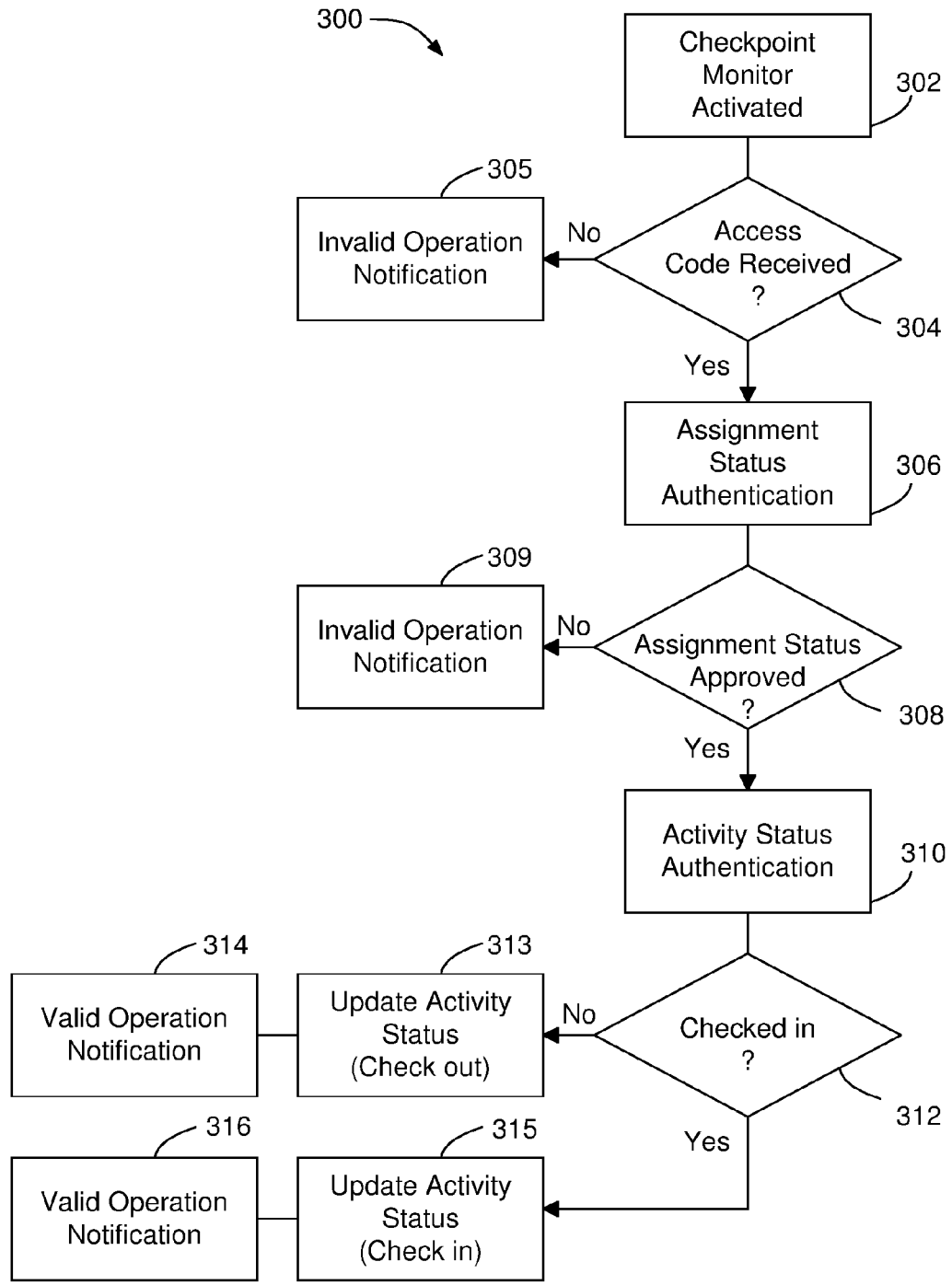
FIG. 9 is an exemplary embodiment of an algorithm performed by a checkpoint monitor to determine the assignment status and the activity status of the users.

FIG. 9 is a flowchart 300 illustrating, in one embodiment, a compliance monitoring algorithm that monitors access to the location to be monitored using the checkpoint monitors 102 installed in the location in connection with the system server 103. Each checkpoint monitor 102 may be configured to authenticate both the assignment status and the activity status of the user by analyzing the access code that is transmitted to the checkpoint monitor 102 from a user access code device. Referring to FIGS. 9 and 1-7B, accordingly, in step 302, when an intrusion or activity in the checkpoint zone Z is detected, the checkpoint monitor 102 is placed in a standby mode for a predetermined time to receive an access code signal 141 from the access code device 142. In step 304, if no access code is received during the standby mode, the checkpoint monitor reports the event as an invalid operation in step 305 to the system server 103 of the monitoring center. The reported invalid operation in step 305 may be recorded as unauthorized entry which may be on the basis of a timeout or incomplete process. However, the invalid operation in step 305 may also occur when an entry into and/or exit out of the checkpoint zone detected by the sensors without receiving an access code. If an access code from the access code device is received in step 304, in step 306, the checkpoint monitor begins authenticating the assignment status of the user that transmitted the access code.

The assignment status of the user may be authenticated by comparing an ID code component of the access code against the user ID codes in the assignment data table stored in the data storage 132 of the checkpoint monitor 102 to determine whether the user is assigned for a scheduled work in the field. In step 308, if the assignment status of the user is not approved, i.e., the user is not assigned for a scheduled work in the field, although the user is an identifiable user with an access code device, the checkpoint monitor reports the event as an invalid operation in step 309 to the system server 103 of the monitoring center with the user ID involved. However, the invalid operation reported in step 309 may be still recorded as a valid event but with a lower score indicating that it is triggered by an authorized user, which may require an investigation by the client. As is understood, the system may include a plurality of such scoring levels indication specific combination of events done by the authorized users and unauthorized users.

If the assignment status of the user is approved in step 308, i.e., the user is assigned for a scheduled work in the field, in step 310, the checkpoint monitor begins authenticating the activity status of the user whose assignment status has been approved. The activity status of the user may be authenticated by authenticating the activity code or the activity status indicator added to the access code signal by the user to provide that the user is either in a check in activity to access the monitored location or in a check out activity to exit the monitored location.

In step 312, if it is determined that the user activity status is not check in, i.e., the user is selected "out" option when transmitting the access code signal, in step 313, the activity status of the user in the assignment data table, which is stored in the checkpoint monitor, may be updated as check out. Further, in step 314, the checkpoint monitor reports the updated check out status as a valid operation to the system server 103 of the monitoring center with the associated user ID. In step 312, if it is determined that the user activity status is check in, i.e., the user is selected "in" option when transmitting the access code signal, in step 315, the activity status of the user in the assignment data table may be updated as check in. Further, in step 316, the checkpoint monitor reports the updated check in status as a valid operation to the system server 103 of the monitoring center with the associated user ID. Furthermore, a scoring system may be used as a qualifier of a check-in or check-out operation based on the travel trajectory followed by a user as detected by the checkpoint monitor 102. The objective is to validate that the user enters the location premises if a valid check in is detected and that the user leaves the location if a valid check out is detected.

Once the system server 103 receives the transmitted activity status of the user with or without authenticated assignment status, the assignment data table 135A in the data storage 150 may be updated with the new activity status data of the user. In the following step, the updated assignment data table or data is transmitted to the rest of the checkpoint monitors in the monitored location to update the assignment data tables stored in each checkpoint monitor. In the next step, the system server 103 may provide the updated activity status of the user to the related client organization in a report via the client interface. Each checkpoint monitor 102 may also be configured to operate independently if they cannot communicate with the system server 103 for some technical reason or communication problem. In such cases, the checkpoint monitors may store both an assignment status data and an activity status data of the user after analyzing the access code signal transmitted to the checkpoint monitor. The stored data may be transmitted to the system server once the communication is reestablished.

Figure 10:
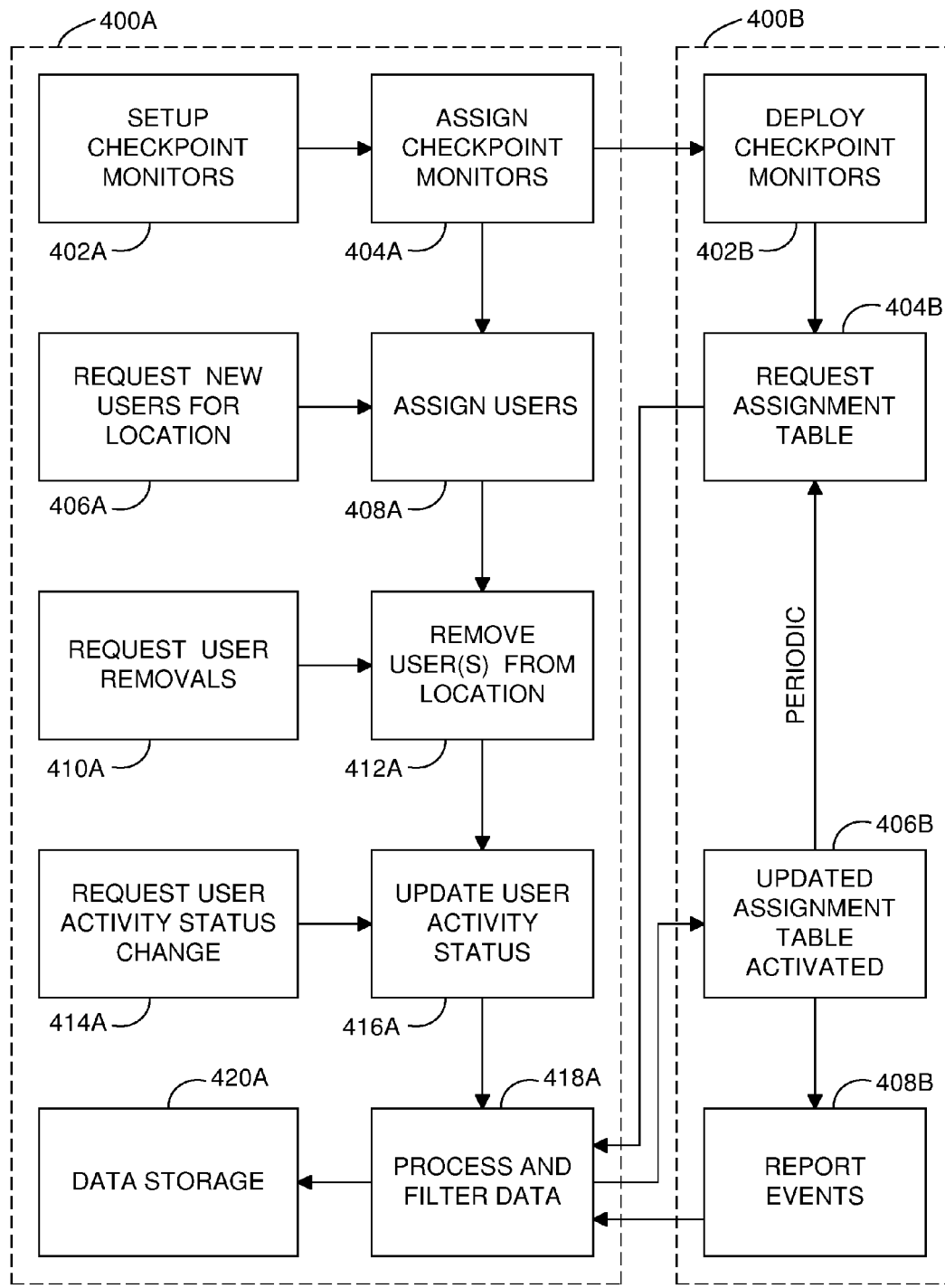
FIG. 10 is a schematic flow chart illustrating an embodiment of an exemplary operation sequence implemented in the system of the present invention.

FIG. 10 is a flowchart 400 illustrating an exemplary embodiment of assigning both the checkpoint monitors and the users to a selected location prior to initiating the compliance monitoring of the present invention in the location of the client organization. In the flow chart 400, for clarity, exemplary operation steps which may be conducted using the system server 103 at the monitoring center of the monitoring organization may be shown within the box 400A and exemplary operation steps which may be conducted at the location using the checkpoint monitors 102 may be shown within the box 400B.

Referring to FIGS. 10 and 1-7B, accordingly, in operation step 402A, initially, the number of checkpoint monitors 102 and their installation positions in the assigned location are determined by either a client organization admin (client admin) via a client interface 104 (FIG. 3) or a monitoring organization admin (monitoring admin). However, the monitoring organization admin may be the only authority to allocate checkpoints and perform assignments based on prior agreement with client admin. Once the setup is completed, in operation step 404A, the monitoring admin may assign the checkpoint monitors to the location by linking their identifications, such as identification numbers, to the location. In one embodiment, the check point monitor assignment may be done by placing the identification numbers of the checkpoint monitors 102 on the assignment data table, as exemplified in FIG. 6. Next, in operation step 402B, checkpoint monitors may be taken to the assigned location and installed at the predetermined positions in the location (see FIG. 1), tested and deployed. In operation step 406A, the client admin may request to add new users to the assignment data table for the same location, and in operation step 408A, the monitoring admin may update the assignment status of users in the assignment data table by linking them to the assigned location (FIG. 6).

In one embodiment, the linking of users to the assigned location may be done by placing user identification and/or user ID code of the user access code device to the assignment data table. In operation step 410A, the client admin may request to remove one or more users from the assignment data table of the location, and in operation step 412A, the monitoring admin may update the assignment status of the users in the assignment data table by removing the users requested to be removed. In operation step 414A, the client admin may request to change user activity status of one or more users on the assignment data table of the location, and in operation step 416A, the monitoring admin may update the activity status of the users in the assignment data table by changing their activity status into the activity status requested by the client admin. In operation step 418A, the data, including the assignment data table, from the operation steps 402A-416A may be processed and filtered, and in operation step 420A, the data including the assignment data table may be stored in the storage 150 of the system server 103 (FIG. 5).

In operation step 406B, an updated and approved assignment data table may be received at the checkpoint monitors at the location after the operation step 418A, and upon request from the check point monitors in operation step 404B. In operation step 408B, feedback from the checkpoint monitors such as activity status updates, valid and invalid operations etc., may also be processed in operation step 418A and stored in the data storage 150.

Figure 11A:
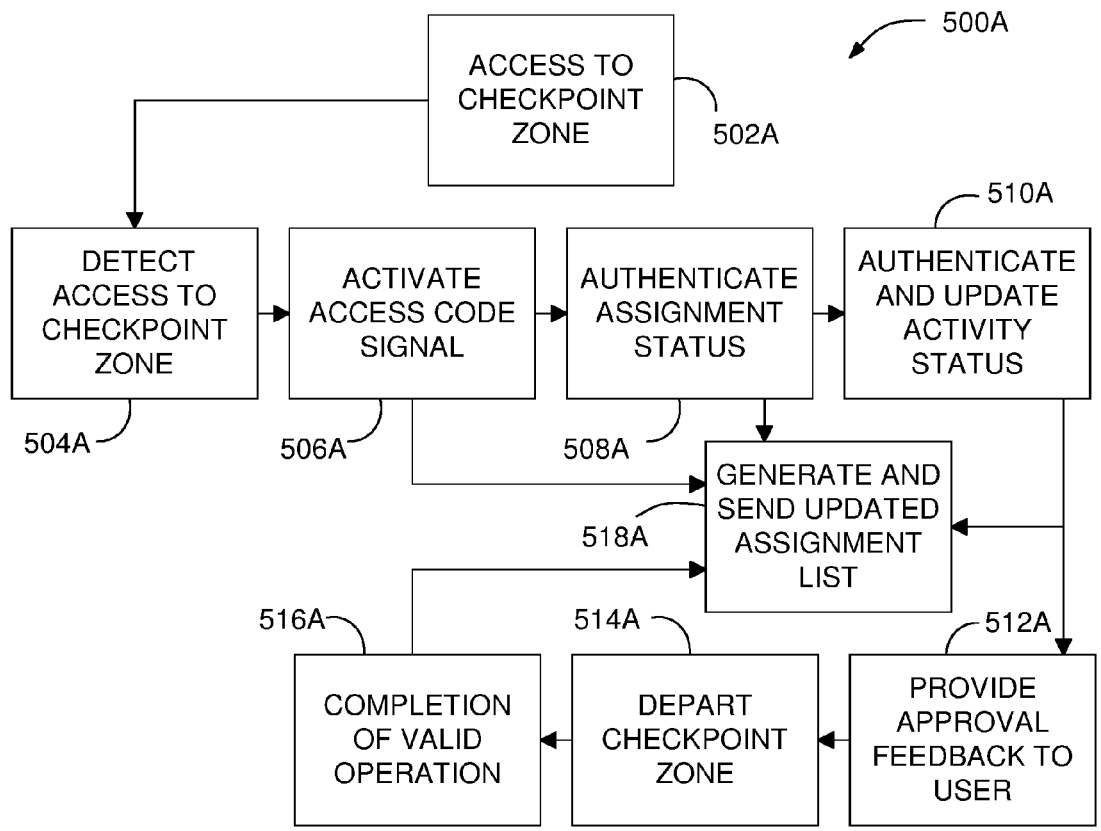
FIGS. 11A-11D are schematic flow charts illustrating embodiments of exemplary operation sequences implemented in the system of the present invention.

FIGS. 11A-11D show various flowcharts illustrating various embodiments of methods using the monitoring system 100 including valid and invalid operation examples. FIG. 11A shows a flowchart 500A exemplifying an embodiment of a valid operation sequence involving authentication of the assignment status and activity status of an authorized user. Referring to FIGS. 11A and 1-7B, accordingly, in operation step 502A a user may access the checkpoint zone Z (see FIGS. 1 and 2A) of checkpoint monitor 102 in the location. In operation step 504A, the checkpoint monitor 102 may sense the user accessing the checkpoint zone and provides audiovisual feedback as well as prompts for user access code. The user may provide the access code signal within a predetermined response time, for example, 10-30 seconds. During the response time a video or still image of the user may be recorded by the checkpoint monitor 102 as image data and stored. In operation step 506A, the user may activate the user access code using the access code device assigned to the user. In operation step 508A, the checkpoint monitor may receive the access code signal, decode it and authenticate user's assignment status as valid assignment by comparing the user ID code component of the access code signal against the user identifications in the assignment data table 135, and register and report it as valid operation.

In operation step 510A, the checkpoint monitor may authenticate the user activity code component of the access code signal to determine the activity status of the user. If the determined activity status is opposite to the current activity status on the assignment data table, the user activity status on the assignment data table is updated as described above via the system server 103. The checkpoint monitor 102 may register and report the updated activity status as valid operation. In operation step 512A, the checkpoint monitor may provide an audiovisual approval feedback to the user and prompt to proceed. In operation step 514A, the user may depart the checkpoint zone in the direction of either into the monitored location or out of the monitored location. In operation step 516A, once the checkpoint monitor 102 senses user's departure, a qualitative score may be calculated based on the valid operations. In operation step 510A, data obtained from the operations steps 502A through 516A may be transmitted to and received by the system server 103. As described above, the system server 103 may form and transmit an updated assignment data table to the checkpoint monitor(s) 102.

Figure 11B:
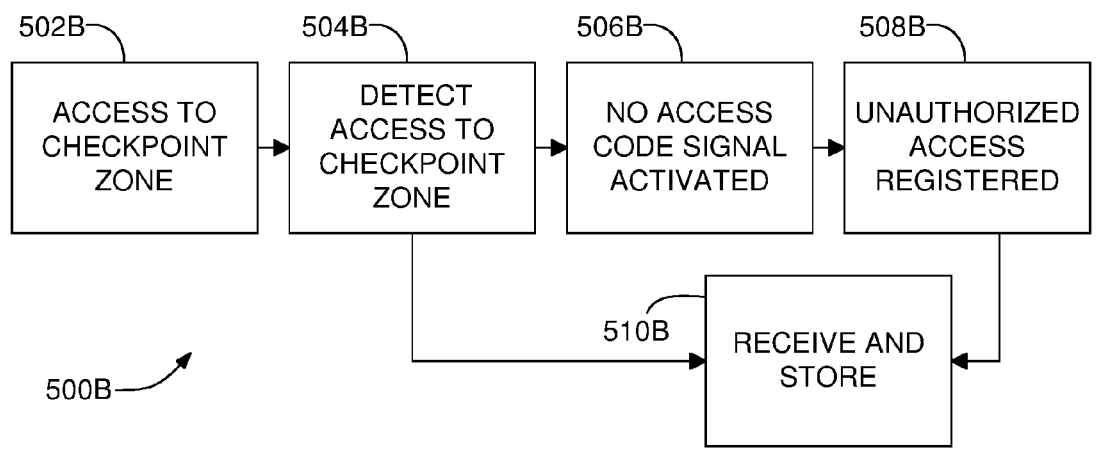

FIG. 11B shows a flowchart 500B exemplifying an embodiment of an invalid operation sequence involving an unauthorized access attempt. Referring to FIGS. 11B and 1-7B, accordingly, in operation step 502B, an access or intrusion to the checkpoint zone Z (see FIGS. 1 and 2A) of checkpoint monitor may occur. In operation step 504B, the checkpoint monitor may sense the intrusion triggered by a person or object and provide audiovisual feedback as well as prompts for user access code and starts the response time.

During this time a video or still image of the checkpoint zone Z may be recorded by the checkpoint monitor 102 as image data and stored. In operation step 506B, no access code signal may be received within the response time by the checkpoint monitor 102 or the accessing person or object may no longer be sensed within the checkpoint zone Z. In operation step 508B, the checkpoint monitor may detect a departure from checkpoint zone Z and report the event as an invalid operation, and in operation step 510B, the main server receives and stores the invalid operation. In operations steps 504B and 508B, the detections may be sequential detections triggering unauthorized entry and/or exit.

Figure 11C:
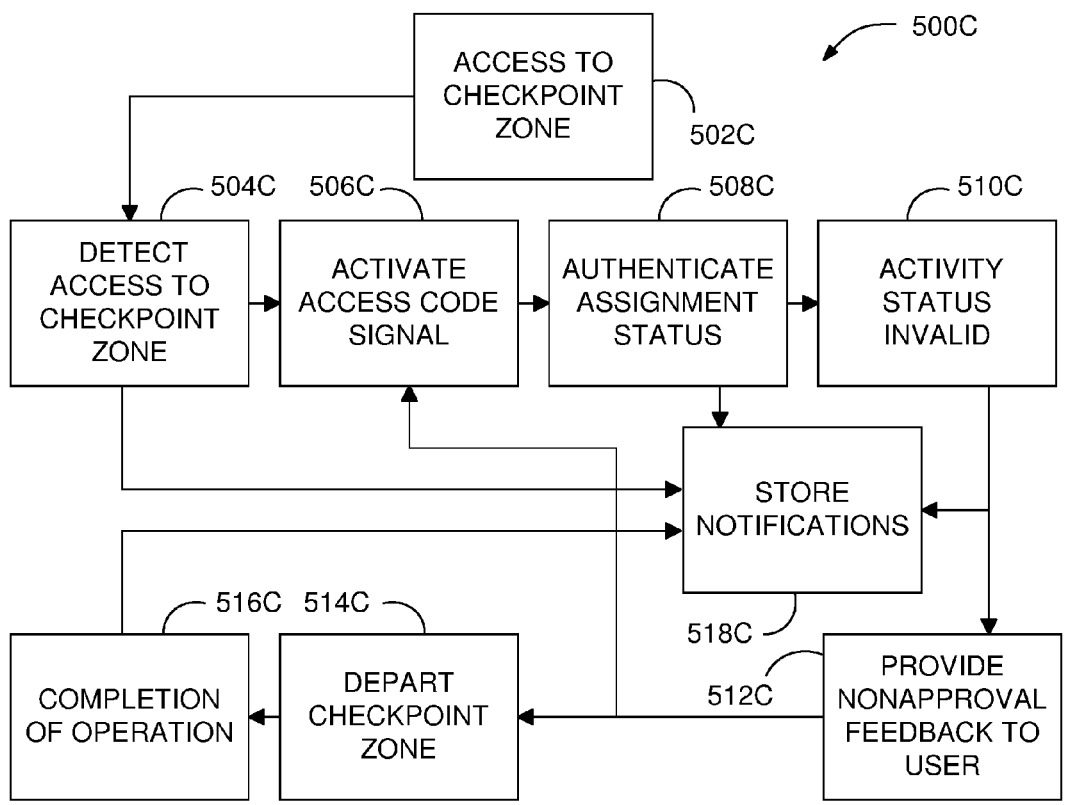

FIG. 11C shows a flowchart 500C exemplifying an embodiment of an invalid operation involving an invalid access status of a user. Referring to FIGS. 11C and 1-7B, accordingly, in operation step 502C a user may access the checkpoint zone Z (see FIGS. 1 and 2A) of checkpoint monitor in the location. In operation step 504C, the checkpoint monitor may sense the user accessing the checkpoint zone and provides audiovisual feedback as well as prompts for user access code. The user may provide the access code signal within a predetermined response time, for example, 10-30 seconds. During the response time a video or still image of the user may be recorded by the checkpoint monitor as image data and stored. In operation step 506C, the user may activate the user access code signal using the access code device assigned to the user. In operation step 508C, the checkpoint monitor may receive the access code signal, decode it and authenticate user's assignment status as valid assignment by comparing the user ID code component of the access code signal against the user identifications in the assignment data table 135, and register and report it as valid operation.

In operation step 510C, the checkpoint monitor may attempt to authenticate the user activity code component of the access code to determine the activity status of the user. If the determined activity status is the same as the current activity status (unchanged) on the assignment data table or the user activity code command is not recognizable, the user activity status on the assignment data table may not be updated. The checkpoint monitor 102 may register and report the activity status as invalid operation. In operation step 512C, the checkpoint monitor may provide an audiovisual disapproval feedback to the user and prompt to retry. If the user retries to authenticate activity status from operation step 506C and succeeds, the operation sequence continues as in FIG. 11A with a valid operation. If not, in operation step 514C, the user may depart the checkpoint zone in the direction of either into the monitored location or out of the monitored location. In operation step 516C, once the checkpoint monitor 102 senses user's departure, a qualitative score may be calculated based on the invalid operation. In operation step 510C, data obtained from the operations steps 502C through 516C may be transmitted to and received by the system server. As described above, the system server 103 may form and transmit an updated assignment data table to the checkpoint monitor(s).

Figure 11D:
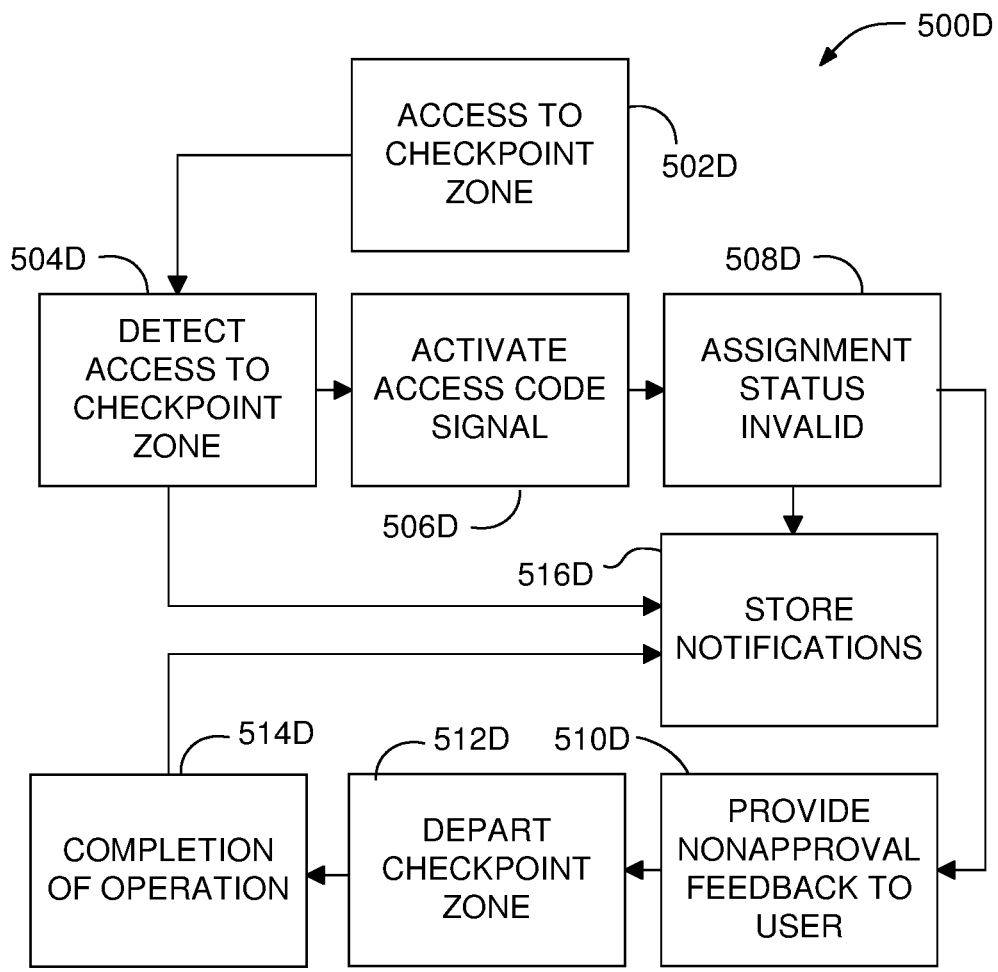

FIG. 11D shows a flowchart 500D exemplifying an embodiment of an invalid operation involving an invalid assignment status of a user. Referring to FIGS. 11D and 1-7B, accordingly, in operation step 502D a user may access the checkpoint zone Z (see FIGS. 1 and 2A) of checkpoint monitor in the location. In operation step 504D, the checkpoint monitor may sense the user accessing the checkpoint zone and provides audiovisual feedback as well as prompts for user access code. The user may provide the access code signal within a predetermined response time, for example, 10-30 seconds. During the response time a video or still image of the user may be recorded by the checkpoint monitor as image data and stored. In operation step 506D, the user may activate the user access code using the access code device assigned to the user. In operation step 508D, the checkpoint monitor may receive the access code signal, decode it and attempts to authenticate user's assignment status by comparing the user ID code component of the access code signal against the user identifications in the assignment data table 135 in the checkpoint monitor 102. If the determined assignment status cannot be determined, i.e., the user is not on the assignment data table or not scheduled for the specific check-in time, the checkpoint monitor may register and report the assignment status as an invalid operation.

In operation step 512D, the checkpoint monitor may provide an audiovisual disapproval feedback to the user and prompt to retry or contact the administration. If the user retries to authenticate assignment status from operation step 506D and succeeds, the operation sequence continues as in FIG. 11A with a valid operation. If not, in operation step 514D, the user may depart the checkpoint zone in the direction of either into the monitored location or out of the monitored location. In operation step 516D, once the checkpoint monitor senses user's departure, a qualitative score may be calculated based on the invalid operation. In operation step 510D, data obtained from the operations steps 502D through 516D may be transmitted to and received by the main server. As described above, the system server may form and transmit an updated assignment data table to the checkpoint monitor(s).

Although aspects and advantages of the present invention are described herein with respect to certain preferred embodiments, modifications of the preferred embodiments will be apparent to those skilled in the art. Thus, the scope of the present invention should not be limited to the foregoing discussion, but should be defined by the appended claims.

We claim:

1. A system for compliance monitoring of a user of a monitored location in a hydrocarbon wellsite, comprising:

a system server in a monitoring center, the system server including a processor and a system data storage including an assignment data table for the monitored location and a system program that when executed causes the processor to operate the system, wherein the assignment data table includes user assignment status data and user activity status data; and at least one checkpoint monitor in the monitored location, each checkpoint monitor including a controller and a local data storage including the assignment data table received from the system server and a control program that when executed causes the controller to operate the checkpoint monitor, wherein each checkpoint monitor is configured to authenticate both a user assignment status and a user activity status by analyzing an access code that is transmitted to the checkpoint monitor from a user access code device, wherein the authentication of the user assignment status identifies the user by authenticating a user identifier included in the access code against user assignment status data included on the assignment data table stored in the local data storage, wherein the authentication of the user activity status updates the user activity status data on the assignment data table by utilizing an activity status identifier added to the access code by the user to provide that the user is either in a check in activity to enter the monitored location or in a check out activity to exit the monitored location, and wherein the system server is configured to form an updated assignment data table by receiving at least one of an updated user activity status data from at least one of the checkpoint monitors and an updated user assignment status data related to the monitored location from a client organization interface.

2. The system of claim 1, wherein the system server is configured to receive the updated user activity status data from each checkpoint monitor and update the user activity status data on the assignment data table stored in the system data storage, and wherein the system server is configured to receive the updated user assignment status data related to the monitored location from the client organization interface and update the user assignment status data on the assignment data table stored in the system data storage.

3. The system of claim 1, wherein the system server is configured to provide an updated assignment data table to each checkpoint monitor in the monitored location once the system server receives the updated user activity status data from the at least one of the checkpoint monitors in the monitored location.

4. The system of claim 1, wherein the system server is configured to provide an updated assignment data table to each checkpoint monitor in the monitored location once the system server receives the updated user assignment status data from the client organization interface.

5. The system of claim 1, wherein the user assignment status data on the assignment data table includes at least one of user name, a user identifier including a user identification number, user's assigned work date in the monitored location, user's assigned work hours on the assigned date in the monitored location, client organization name, regional location including city, state and country, monitored location identification, checkpoint monitor identification number, checkpoint monitors' position information in the monitored location.

6. The system of claim 1, wherein the access code device includes a mobile device assigned to the user, the mobile device being configured to transmit the access code including the activity status identifier as a wireless signal including RF.

7. The system of claim 6, wherein the access code device is disposed on the checkpoint monitor and including one of a biometric reader, keypad and touchscreen so that the access code including the activity status identifier is entered manually by the user.

8. The system of claim 7, wherein the activity status identifier is selected using one of a key, keypad, a touchzone or touchpad with pre-assigned activity status selections.

9. The system of claim 1 further including one or more presence sensors disposed on each checkpoint monitor and directed to checkpoint zones surrounding each checkpoint monitor, the presence sensors being activated when the checkpoint zone is accessed by the user.

10. The system of claim 9 further including one or more cameras disposed on each checkpoint monitor and directed to the checkpoint zones, each camera being coupled to the presence sensors and configured to take still images or videos of the checkpoint zone when the checkpoint zone is accessed.

11. The system of claim 1 further including an access module located on each checkpoint monitor, the access module being configured to receive the access code from the access code device that is operated by the user.

12. The system of claim 9 wherein the checkpoint zone is on an entrance-exit route of the hydrocarbon wellsite.

13. The system of claim 1, wherein the hydrocarbon wellsite is surrounded by a porous fenceless border and includes at least one hydrocarbon well facility.

14. A method for compliance monitoring of a user of a monitored location in a hydrocarbon wellsite, comprising:
providing a system server in a monitoring center, the system server including a processor and a system data storage including an assignment data table for the monitored location and a system program that when executed causes the processor to operate the system, wherein the assignment data table includes user assignment status data and user activity status data;
installing at least one checkpoint monitor in a checkpoint zone located on a perimeter of the monitored location, each checkpoint monitor including a controller and local data storage including the assignment data table received from the system server and a control program that when executed causes the controller to operate the checkpoint monitor;
establishing a communication link between each checkpoint monitor and the system server;
transmitting an access code to one of the check point monitors from a user access code device operated by the user;
determining a user assignment status by authenticating a user identifier included in the access code against the user assignment status data on the assignment data table stored in the local data storage;
determining a user activity status by updating the user activity status data on the assignment data table by utilizing an activity status identifier added to the access code by the user to provide that the user is either in a check in activity to enter the monitored location or in a check out activity to exit the monitored location; and
forming an updated assignment data table in the system server by receiving at least one of updated user activity status data from at least one checkpoint monitor and updated user assignment status data related to the monitored location from a client organization interface.

15. The method of claim 14 further comprising, prior to the step of installing, assigning each checkpoint monitor to the monitored location by linking an identifier of each checkpoint monitor to the monitored location on the assignment data table stored in the system data storage.

16. The method of claim 15 further comprising assigning the user to the monitored location by linking at least one of user identity and access code device number to the monitored location on the assignment data table stored in the system data storage.

17. The method of claim 14, wherein forming an updated assignment data table in the system server comprises:
receiving the updated user activity status data from at least one of the checkpoint monitors,
updating the user activity status data on the assignment data table stored in the system data storage,
receiving the updated user assignment status data related to the monitored location from the client organization interface, and
updating the user assignment status data on the assignment data table stored in the system data storage.

18. The method of claim 14 further comprising providing an updated assignment data table to each checkpoint monitor in the monitored location once the system server receives the updated user activity status data from the at least one of the checkpoint monitors in the monitored location.

19. The method of claim 14 further comprising providing an updated assignment data table to each checkpoint monitor in the monitored location once the system server receives the updated user assignment status data from the client organization interface.

20. The method of claim 14, wherein the user assignment status data on the assignment data table includes at least one of user name, a user identifier including a user identification number, user's assigned work date in the monitored location, user's assigned work hours on the assigned date in the monitored location, client organization name, regional location including city, state and country, monitored location identification, checkpoint monitor identification number, checkpoint monitors' position coordinates in the monitored location.

21. The method of claim 14, wherein transmitting the access code comprises transmitting an access code signal including an RF signal emitted when the activity status identifier is selected on the access code device.

22. The method of claim 21, wherein selecting the activity status identifier is performed using one of a key, a keypad, a touchzone or a touchpad with pre-assigned activity status selections.

23. The method of claim 14 further comprising sensing checkpoint zones surrounding each checkpoint monitor using one or more presence sensors disposed on each checkpoint monitor, the presence sensors being activated when the checkpoint zone is accessed by the user.

24. The method of claim 23 further comprising taking still images or videos using one or more cameras disposed on each checkpoint monitor and directed to the checkpoint zones, each camera being coupled to the presence sensors and configured to get activated when the checkpoint zone is accessed.

25. The method of claim 14 further including, subsequent to transmitting the access code, receiving the access code using an access module disposed on each checkpoint monitor, the access module being configured to receive the access code from the access code device that is operated by the user.

26. A checkpoint monitor device of a monitoring system for compliance monitoring of users of a monitored location in a hydrocarbon wellsite, the checkpoint monitor device comprising:
 a controller and a data storage storing a control program that when executed causes the controller to operate the checkpoint monitor;
 an assignment data table received from the monitoring system and stored in the data storage, the assignment data table having user assignment status data and user activity status data, wherein the user assignment status data includes at least an identifier of a wireless access code device assigned to a user having authorization to access the monitored location;
 wherein the controller operable to analyze an access code received from the wireless access code device and authenticate both a user assignment status and a user activity status,
 wherein the authentication of the user assignment status identifies the user by authenticating the identifier of the wireless access code device included in the access code against the assignment status data on the assignment data table, and
 wherein the authentication of the user activity status updates user activity status data on the assignment data table by utilizing an activity status identifier added to the access code by the user to provide that the user is either in a check in activity to enter the monitored location or in a check out activity to exit the monitored location; and
 a communication module configured to transmit updated user activity status data to a system server of the monitoring system to form an updated assignment data table.

27. The checkpoint monitor device of claim 26, wherein the checkpoint monitor is configured to receive the updated assignment data table once the system server receives the updated user activity status data from the checkpoint monitor in the monitored location.

28. The checkpoint monitor device of claim 27, wherein the checkpoint monitor is configured to receive the updated assignment data table once the system server receives an updated user assignment status data from a client organization interface.

29. The checkpoint monitor device of claim 26, wherein the user assignment status data on the assignment data table includes at least one of user name, a user identifier including a user identification number, user's assigned work date in the monitored location, user's assigned work hours on the assigned date in the monitored location, client organization name, regional location including city, state and country, monitored location identification, checkpoint monitor identification number, checkpoint monitors' position in the monitored location.

30. The checkpoint monitor device of claim 26, wherein the wireless access code device is a mobile device and the access code including an RF signal emitted when the activity status identifier is selected on the access code device.

31. The checkpoint monitor device of claim 30, wherein the activity status identifier is selected using one of a key, a keypad, a touchzone or a touchpad with pre-assigned activity status selections.

32. The checkpoint monitor device of claim 26 further including one or more presence sensors disposed on each checkpoint monitor and directed to checkpoint zones surrounding each checkpoint monitor, the presence sensors being activated when the checkpoint zone is accessed by the user.

33. The checkpoint monitor device of claim 32 further including one or more cameras disposed on each checkpoint monitor and directed to the checkpoint zones, each camera being coupled to the presence sensors and configured to take still images or videos of the checkpoint zone when the checkpoint zone is accessed.

34. The checkpoint monitor device of claim 26 further including an access module disposed on each checkpoint monitor, the access module being configured to receive the access code from the wireless access code device that is operated by the user.

\* \* \* \* \*